July 31, 1956 P. O. PFEIFFER 2,756,799
ANTI-SKID ICE TIRE
Filed April 6, 1951 2 Sheets-Sheet 2
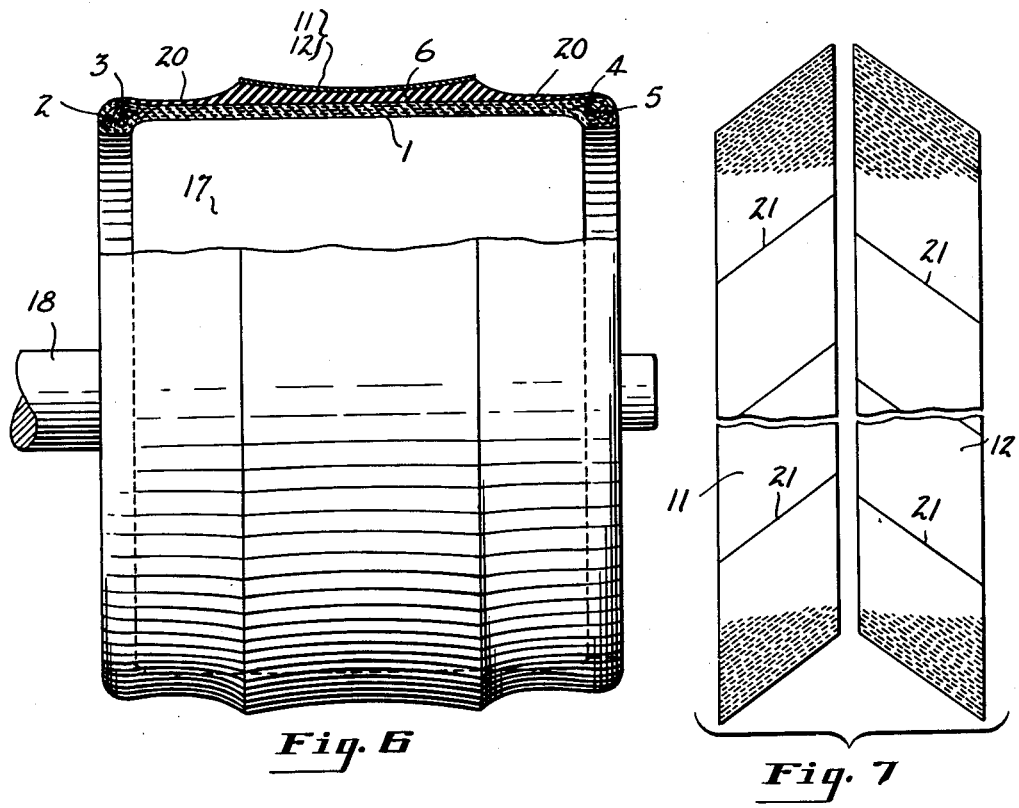
Fig. 6
Fig. 7
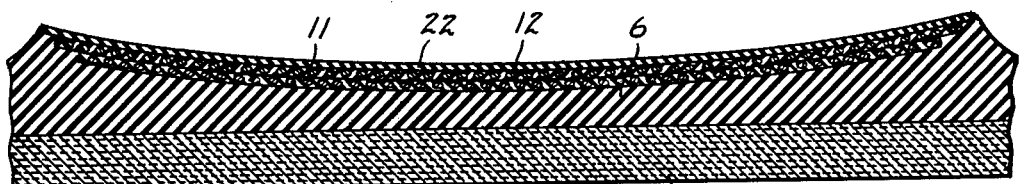
Fig. 8
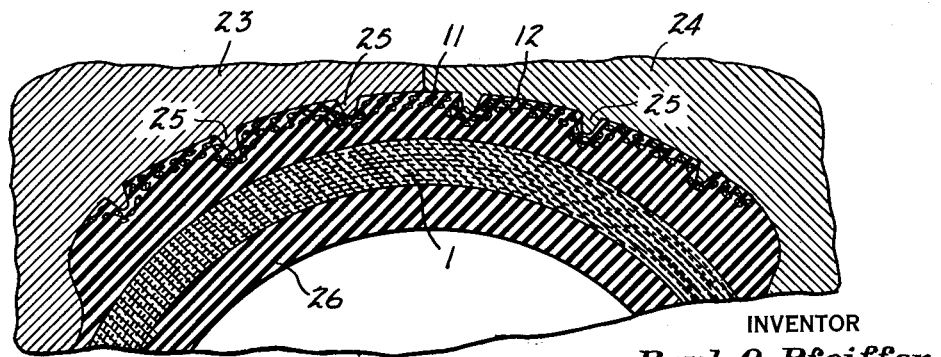
Fig. 9
INVENTOR
Paul O. Pfeiffer
BY Evans + McCoy
ATTORNEYS

United States Patent Office

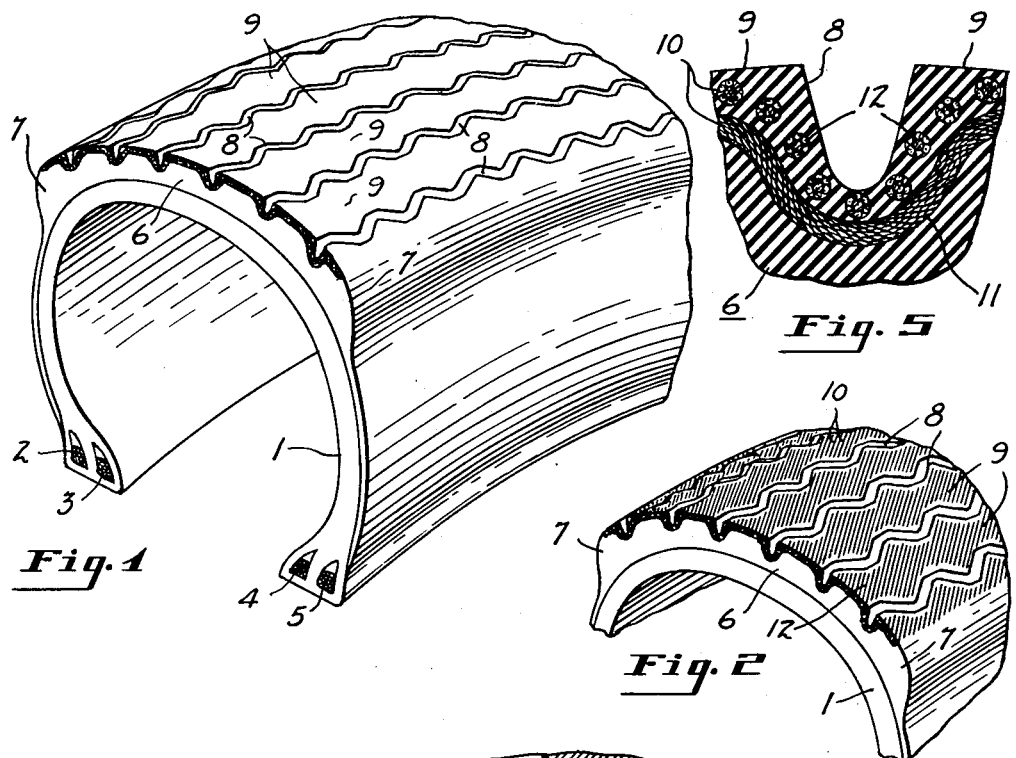
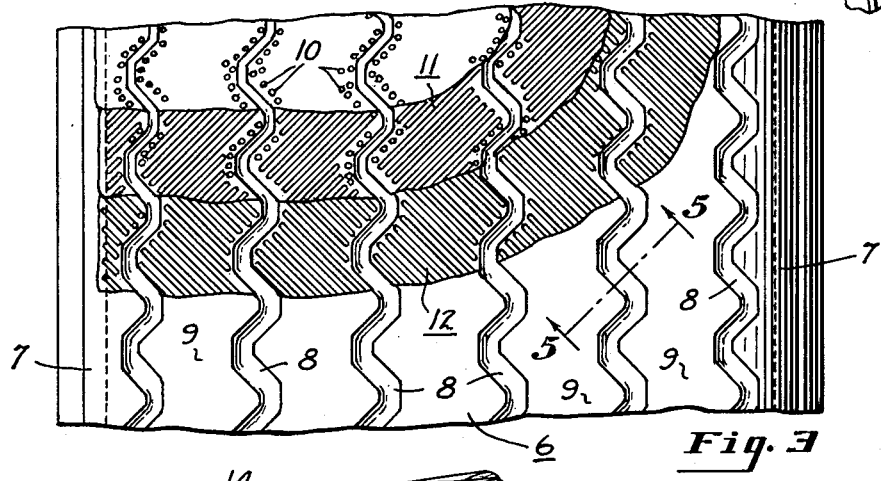
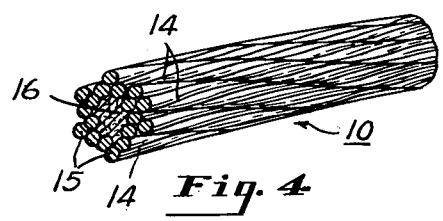

2,756,799
ANTI-SKID ICE TIRE

Paul O. Pfeiffer, Akron, Ohio, assignor to The General Tire and Rubber Company, Akron, Ohio, a corporation of Ohio Application April 6, 1951, Serial No. 219,709

2 Claims. (Cl. 152—211)

This invention relates to pneumatic vehicle tires, more particularly to tires of the type known in the trade as ice or anti-skid tires and which have hard elements embedded in their tread rubber so as to be exposed for engagement with the road surface upon wearing away of the tread.

It has been long recognized that the surface gripping characteristics of vehicle tires can be improved by embedding helical coil springs, metal plates, metal cups and like hard elements in the tire tread, such elements being exposed by placement or tread wear to bite into the road or highway surface to resist slippage of the tire. In the case of a pneumatic or inflatable rubber tire, the relatively large distortion and deformation encountered in operation frequently results in loosening and even dislodgment and loss of the embedded elements, particularly elements that are relatively stiff or are of relatively large size or bulk. An improved tire of the type referred to is obtained by suitably embedded in the rubber or tread portion one or more layers of metal wire elements preferably comprising fine wires of high tensile strength laid up in multiple filament twisted cables. The individual cables or elements are so arranged in relation to one another and to the tire that during the wearing away of the tread only a fractional portion or series of fractional portions of each element are exposed to the road surface. The other and preferably the major portion or portions of the individual elements remain anchored at varying depths within the rubber body of the tread, preferably in a particular relationship to grooves provided in the tread surface.

It is, therefore, one of the principal objects of the invention to provide a new and improved vehicle tire of the character mentioned. More particularly, it is sought to provide a pneumatic vehicle tire having within the tread rubber one or more layers of multiple strand metal wire cables or cords, the individual cords being preferably disposed transversely across the tread of the tire and embedded therein in such manner that adjacent portions of each cord are located at different depths. As a further refinement of the invention, it is sought to provide a pneumatic tire wherein a layer or layers of metal wire elements which take the form of flexible cords composed of multiple strands of relatively fine twisted metal wires of high tensile strength are arranged with the individual cords or wire elements in generally parallel relation to one another, the cords or elements extending across the tire tread, preferably diagonally, substantially from one shoulder to the other of the tire. In such tire, the individual wire elements or cables, while being generally parallel to one another, are individually of wave form or shape, providing spaced portions along the length of each that are at or relatively close to the road engaging tread surface of the newly molded tire to become exposed as the tread wears and thereby provide the desired anti-skid or anti-slip properties. Other or intervening anchoring portions of the wire elements or cable cords are more deeply embedded in the rubber body of the tread, preferably extending transversely to the tread grooves or channels and in underlying relation to the latter.

Although it is feasible to employ straight metal wires of solid section for embedment in the tire tread of the present invention, it is preferable to use laid up multiple strand cable of the twisted filament type. A plurality of strands, six being a suitable number, each comprising a plurality of twisted filaments, are laid up in accordance with conventional procedures to form the flexible wire cables. Each of the twisted strands or wire assemblies can be conveniently made of three filaments of relatively fine high tensile strength steel wire. The laying up of the filaments into strands and the strands into cables is done in accordance with conventional procedures, the cables having the customary nonmetallic cores or, if desired, being of the coreless type in which a strand of twisted wire filaments replaces the core.

Prior to twisting of the individual metal wire filaments into the strands and cables, the filaments are brass coated as by electrolytic deposition. This treatment or coating of the steel wires used, the brass comprising an alloy of about 70 per cent copper and about 30 per cent zinc, permits a strong bond to be established between the individual steel wires and the rubber body of the tire tread in which the steel cables are embedded.

To facilitate the handling of the wire elements in the tire building process, whether they be of the solid section monofilament type or of the laid up multiple filament cable type, they are preferably assembled preliminarily in ply layers with the individual elements in parallel relation to one another similar to the arrangement conventionally employed in making cord ply material for the carcass or body of a conventional pneumatic tire. One suitable procedure is to feed a multiplicity of steel wire cables or elements in closely spaced parallel relation to one another into the bight between calender rolls carrying raw or partly cured rubber stock in the form of thin sheets known as "squeegee." The two sheets of "squeegee," each being, say, approximately .03 inch thick, are thus forced against the opposite sides of the parallel elements or cables being drawn between the calender rolls and embed the elements or cables sandwich fashion in and between the two rubber sheets forming a flexible metal element reinforced unitary rubber sheet. This sheet is then cut on the bias at a suitable angle such as approximately 36° and the individual pieces assembled in end to end relation in accordance with conventional procedures used in the making of tire cord ply material to form a continuous strip containing obliquely disposed parallel wire elements or cables. This bias strip material or a portion thereof is then wrapped in one or more layers about the tread portion of a previously built conventional tire band preferably before the latter is expanded or even withdrawn from the building form. The wire element ply material is of approximately the same width as the tire band portion which forms the road engaging tread of a completed tire, the wire element carrying strip being centered on the tread stock. The inherent tackiness of the raw or partially cured sheet rubber forming the wire element ply material causes the latter to adhere in assembly to the tread stock of the tire band. When employing two or more layers of the metal element sheet material, it is desirable to arrange each successive layer with the individual obliquely disposed elements running opposite and transverse to the individual elements of the preceding layer.

Tire bands suitable to receive the layer or layers of wire element ply material include many types, such, for example, as those conventionally made on cylindrical drums in accordance with the well-known flat band process. In such case, the wire element ply material strips, placed about the tire band while the latter is on the building drum as suggested above, can be pressed and compacted against the tread stock by the usual rollers and other pressure applying or "stitching" devices to insure a strong bond free of air pockets and the like. The wire bearing ply material may, of course, be applied to the tread strip of tires built on forms other than the cylindrical drum of the flat band process.

The layer or layers of wire bearing ply material are preferably covered after application to the tire band by a layer of thin rubber stock which serves as a cushion during subsequent handling and molding of the tire. This thin sheet rubber covering or "squeegee" may also be applied while the tire band is on the building drum.

After placing the wire bearing ply material on the tire band, the assembly is removed from the building form or drum and expanded to tire shape using conventional methods and procedures. The expanded tire band, carrying the embracing layer or layers of bias metal wire elements also expanded circumferentially during expansion of the tire band, is placed in a heated mold and vulcanized or cured in the usual manner. The mold employed, while generally of conventional character, preferably is formed with spaced projections for engaging the tread portion of the tire, the projections desirably extending in circumferential relation about the tire in the form of ribs. These projections, located on the tread shaping portion of the mold, are forced into the relatively thick tread rubber stock of the tire band during the molding and vulcanizing operation. The heat plasticizes the thick rubber body comprising the tread and shoulders of the tire so that under the molding pressure a portion or portions of such rubber flows into and between the individual metal wire elements. The projections or ribs of the mold exert concentrated pressure on localized points along the lengths of the metal wire elements, forcing such localized points or portions more deeply into the heat softened plastic rubber of the tread than the intervening portions of the elements, the latter remaining at or relatively close to the tread rubber surface. Each of the multiplicity of metal wires, extending as it does diagonally across the tread portion of the tire, is thus engaged by the mold projections or ribs at a plurality of spaced points along its length. These spaced points, forced as they are by the mold ribs or projections deeply into the tread rubber, obtain firm anchorages in the tread rubber body. Each wire takes a wave form in which spaced deeply embedded portions alternate with a plurality of intervening portions located at or relatively close to the road engaging surface of the tire tread. Upon completion of the cure or vulcanization of the tire in the heated mold, the latter is open and the tire removed and finished in the usual fashion.

During operation, the wearing away of the tread surface progressively exposes the spaced portions along the length of each of the wire elements that are relatively close to the tread surface. These exposed wires bite into the surface on which the tire travels and provide an effective anti-slip action particularly on a glazed or icy surface. Continued wearing of the tread, even to the extent that some or all of the wires become worn through and severed at one or more points, does not objectionably deteriorate the exposed surface or impair the anti-skid properties. The deeply embedded portions of the metal wires, bonded as they are to the inner and protected parts of the rubber of the tire tread, prevent detachment and loss of the skid resisting wires even though the latter may become severed at several points along their lengths. The ends of the individual severed wire portions become and remain exposed.

Wire elements that are in the form of multiple strand twisted wire cables tend to fray in use, providing a multiplicity of tufted ends which are effective in providing the desired anti-skid action. Cables made up of strands of which the individual filaments are fine wires are sufficiently flexible to yield and distort with the carcass or body of the tire and any tendency of the cables to separate from the rubber body is minimized. The tire thus retains exposed cable portions and exposed cable ends substantially throughout its entire life until the tread portion has been substantially completely worn away.

The tire building procedure and the structural details of a tire embodying the principles of the invention and attaining the objectives outlined above are illustrated in the accompanying drawings forming a part of this specification, the particular details shown being merely representative of a number of arrangements that are satisfactory.

In the drawings:

Figure 1 is a perspective view through a section of a fragmentary portion of a pneumatic tire of the type used on aircraft, the tire having been made in accordance with the present method and incorporating in the tread portion embedded metal wire cables in accordance with the concept of the present invention;

Fig. 2 is a perspective view of a small fragment of the tire section or portion of Fig. 1 showing the appearance of the road engaging tread surface after the embedded metal wire cables have been exposed as by wear or abrasion;

Fig. 3 is a plan view, partly diagrammatic, of a fragmentary portion of the tire tread, portions being removed in successive layers to show the embedded wire cables, this view being enlarged with respect to Figs. 1 and 2;

Fig. 4 is an enlarged perspective view of a short length of multiple strand twisted steel wire cable of the type used to make the anti-skid tire of the present invention;

Fig. 5 is a fragmentary sectional detail taken substantially on the line indicated at 5—5 of Fig. 3 and enlarged with respect to that figure;

Fig. 6 is an elevational view, partly diagrammatic, partly in section and with parts removed, showing a conventional tire building drum of the type used in the conventional flat band process, the drum having mounted thereon a completed tire band including the annular layers of bias metal wire cable ply material of the present invention;

Fig. 7 is a diagrammatic view showing the strips of bias cut metal wire cable ply material used in the present process and tire;

Fig. 8 is an enlarged sectional detail, partly diagrammatic, of the tread portion only of the tire band shown in Fig. 5; and Fig. 9 is a fragmentary sectional detail, partly diagrammatic, taken transversely through a mold used in curing and shaping the tire, this view showing the expanded tire band inflated as by an internal air bag in the steam heated mold and showing the pattern forming ribs of the mold engaged against spaced portions of the steel wire cables which have been forced by the ribs into the thick rubber of the tread body softened by the mold heat.

The contemplated process for making the skid resisting tire of the present invention can be used without objectionable interference with tire building methods now common and without special equipment or tools. The tire of the present invention resembles and is of the same general construction as a conventional tire. A landing wheel tire such as may be used on military aircraft is illustrated in the drawings although, of course, the invention is applicable to automobile, bus and truck tires for use on paved highways.

Referring to Figs. 1 through 3, the tire comprises a casing having a multiple ply cord body 1 incorporating conventional bias cut plies or layers of rubber embedded cords. The ends of the cords are wrapped about or otherwise suitably secured to inextensible annular bead anchorages or hoops. The illustrated tire has multiple hoop beads designated at 2, 3, 4 and 5. The road engaging tread portion of the tire, indicated at 6, comprises a relatively thick or heavy sectioned mass of suitably compounded rubber, the marginal portions of the tread constituting shoulders 7. Extending circumferentially about the tire are grooves or channels 8 which open through the road engaging surface of the tread. The channels, completely annular in extent, although not necessarily so, extend around the entire circumference of the tire and are spaced in parallel relation to one another dividing the tread into a plurality of circumferential ground engaging ribs 9. Other configurations of the tread grooves may be employed, the grooves 8 being either straight, wavy or, as shown, zig zag.

Embedded in the thick tread portion 6 of the tire body are the metal wire elements or cables previously mentioned. These cables, designated at 10, are disposed in one or more layers or plies, two layers designated generally at 11 and 12 being shown. The individual cables of each layer are disposed in side by side relation, being parallel insofar as parallelism can be retained in manufacture. When the expanded tire band is later cured in a heated mold the cbles are subjected to localized pressure at spaced points along their lengths to force the cables into the tread rubber stock. Some displacement from parallelism may then occur and is not objectionable and, of course, corresponding portions of the cables are displaced and bent by the groove forming ribs of the mold.

All or both of the wire cable ply layers are arranged with the individual cables disposed diagonally across the face of the tread as shown in Fig. 3. The cables of successive ply layers extend in opposite directions. Each of the cables 10 is a composite structure being formed with a multiplicity of twisted strands 14. A six strand cable is shown although, of course, the number of strands can be increased or decreased, the cable being designed with sufficient bulk and strength to give the desired skid resisting action while yet being of sufficient flexibility to avoid tearing of the tread rubber and dislodgment and loss of the cable. Each of the strands 14 is made up of a plurality of twisted wires or filaments 15, three in number. The strands 14 of twisted wire filaments are in turn twisted and laid up on a central core element 16 which may be formed of natural or synthetic fibers or may itself be another strand of twisted wire filaments similar to the strands 14.

The steel wire cables 10 may be the same as those employed in the manufacture of conventional steel cable pneumatic cord tires in which steel cables replace the more common cotton or synthetic fiber cords. By way of example, the wire rope or cable 10 may be that known in the trade as 6 x 3 x .0058 inch. The construction of the cable is such that six strands of three wires each, the individual wires of about .0058 inch diameter preferably having been previously brass plated as by an electrolytic process, are laid up and twisted around the central core element 16. Either a twisted or monofilament core is satisfactory, monofilament core being of about .013 inch diameter, twisted yarn core being of about .018 inch diameter.

A nominal lay of about .214 inch is used in the three wire strands, the strands being twisted at the rate of about 4.7 turns per inch. A nominal lay of about .320 inch and opposite to that of the strands is used in the six strand cable, the cable being given a twist of about 3.1 turns per inch.

Steel wire, preferably brass plated preliminarily and having a bright finish, is used in the strands. The wire has a diameter of about .0058 inch and is known as medium tensile wire rated nominally at about 350,000 pounds per square inch tensile strength. The brass coating, deposited on the steel wire electrolytically, has a weight preferably of from about 0.7 to about 1.5 grams per kilogram of wire, or equivalent. Although, as mentioned, it is preferable that the wires be plated prior to assembling and twisting into the cable or rope, it is satisfactory to do the plating after the cable has been laid up. After plating and forming of the cable, the surfaces of the wires must be clean and bright and must be retained in this condition, free from oil, grease, moisture and rust, so as to insure a strong bond between the individual wires and the tread rubber body in which they are embedded during the curing process. The cable may, for example, be passed through a suitable detergent and protective dip or dips after plating and cleaning to provide on the wire surface a protective film compatible with the bonding operation.

In adapting conventional tire building processes pursuant to the contemplated method of the present invention for building anti-skid tires of the character described, there is no substantial interference with the initial steps or procedures. The well-known flat band process, for example, can be used in the building of the aircraft landing tire referred to, the building of the tire band being done on a form such as shown diagrammatically in Fig. 6. A cylindrical drum that may be collapsed for removal of the band is indicated at 17 and a horizontally disposed cantilever shaft for mounting the drum rotatably is indicated at 18. Briefly described, the building process for the tire band comprises placing or wrapping a plurality of layers or plies of bias cord material about the drum 17 to form the cord reinforced body 1. At the side margins or shoulders of the drum, the steel wire bead rings or hoop anchorages 2, 3, 4 and 5 are wrapped in the marginal portions of the ply material after which a strip of rubber stock is wrapped about and superimposed on the ply material body 1. The rubber stock strip, formed as by extrusion, has a contour suitable to provide the desired cross sectional shape in the resulting annular tread band. In addition to the relatively thick tread forming portion 6 the tread band includes thinner marginal portions 20 which are disposed against the ply band between the tread and the beads and that form the tire side walls. The illustrated tire, being intended for heavy duty on a military airplane, has as many as ten or more layers of bias cord ply material in the body 1. In addition to the full width plies, one or more reinforcing plies or breakers may be centered about the body 1 and located immediately underneath the thick tread rubber 6 and between the latter and the cord reinforced body 1.

After the strip of rubber stock that is to comprise the tread, shoulders and side wall coverings of the tire has been applied to the ply material body 1 and pressed or compacted in place, the ply layers 11 and 12 are wrapped about the tire band while the latter is supported on the drum 17. The metal wire ply layers 11 and 12, each incorporating the parallel wire elements or cables 10, are placed one on the other in superimposed relation about the thick sectioned tread forming portion 6 of the rubber stock strip. In each of the strips 11 and 12, the individual wire elements or cables are obliquely disposed to provide the desired bias arrangement. Various angles can be employed since the particular direction of the wire elements or cables has not been found to be critical. It is, however, preferable to provide some bias or slant to the wire elements, an angle of from about 30° to about 45° preferably about 36° being satisfactory. The angle of the cable is conventionally measured in accordance with the customary practice in measuring the bias angle of weftless fabric or cord ply material. Such angle is measured between the longitudinal axis of the cable or wire element and a plane normal to the rotational axis of the drum 17 on which the tire band is assembled.

Although the strips 11 and 12 containing the parallel wire elements or cables embedded in or between a rubber sheet or sheets show (Fig. 3) the bias wire elements extending in opposite directions it is feasible, in building the tire bands, to draw all the cable bearing material from a common supply roll of bias element strip material. The reverse angle is provided by merely turning over one of the strips. The bias wire strip ply material may, of course, comprise a plurality of relatively short strips spliced together in end to end relation along lines indicated at 21 in Fig. 7.

By reason of the inherent tackiness of the rubber composition comprising the sheet material in which the wire elements 10 are embedded, the bias wire or element layers 11 and 12 adhere in assembly to one another and to the outside surface of the thick portion 6 of the tread rubber strip. After the strips 11 and 12 have been placed about the tire band they are firmly pressed against the tread rubber strip by rollers or "stitching" wheels so as to drive or force out any air that may be entrapped between the wire ply layers or between such ply layers and the tread rubber strip. In this compacting of the bias metal ply layers, the thick uncured or partially cured tread rubber 6 is kneaded and worked so that the margins of the bias metal layers 11 and 12 become flush with the surface of the tread rubber stock, or subtantially so, as shown in Fig. 8. This treatment avoids loose margins along the edges of the cable or wire element strips 11 and 12 so that the latter remains firmly bonded to the underlying rubber during subsequent expansion and molding of the tire band. In certain instances, as an added protection or covering for the wires, a thin layer 22 of raw or partially cured rubber stock may be placed or wrapped about the cable strip 12 to provide an outside rubber cushion.

Collapsing of the building drum or form 17 in the usual manner permits axial removal of the cylindrical tire band, the latter having the general appearance shown in Fig. 6. To complete the tire, the band is bagged or expanded by conventional methods and placed in a steam heated mold as shown in Fig. 9. The mold comprises separable sections 23 and 24 each having integral circumferentially extending internal ribs 25 which are shaped to form the grooves or channels 8 (Figs. 1–3) in the road engaging tread portion of the tire. An air bag 26 is used to inflate the tire during the curing or molding process, the air bag being in the form of the usual thick walled hollow rubber annulus. Heat is supplied to the mold sections 23 and 24 by the circulation through cavities or channels (not shown) of steam at the temperature required for vulcanization of the particular rubber compound employed in the tire being made. Steam may also be supplied to the interior of the air bag 26.

During the curing process the heat softens the rubber of the tire, the thick sectioned tread rubber 6 yielding and flowing under the concentrated pressure localized along the mold ribs 25. The hot rubber, in a plastic flowable condition, is forced through and between the wire elements or cables 10, particularly adjacent and along the mold ribs 25. At spaced intervals along the lengths of the individual wire elements or cables 10 the latter are bent or deflected inwardly providing a series of spaced U-shaped portions that are more deeply embedded in the tread rubber stock than other or intervening portions. The deeply embedded U-shaped portions of the wire elements thus become firmly locked into the tread rubber body 6 so as to prevent dislodgment even when the wearing away of the tire has completely obliterated the tread grooves 8. Some of the hot plastic rubber flows completely through the wire element ply layers 11 and 12, forming protective rubber corner edges along the sides of each of the tread ribs 9. These rib corners accordingly remain deformable and flexible in service, the wearing away of the tread exposing the cables or wire elements 10 principally along the central portion of each of the tread ribs 9.

As the wearing away of the tread rubber either naturally or artificially as by buffing thus progressively exposes the cables 10, the latter also wear away or through, providing when the wear of the tire is sufficiently advanced so that the wire elements or cables are each worn through at a number of points, frayed ends spaced along the length of each of the wires or cables. The tire tread thus comprises a multiplicity of relatively deeply embedded U-shaped metal wire elements having free ends projecting through the road engaging tread surface and, in the case of multiple strand fine wire cable elements, individually relatively flexible and deformable. Although it is apparent that this feature is particularly advantageous when employing twisted wire cables as the elements in the bias wire ply material, many of the advantages are obtained by the use of straight or untwisted wire elements. The ends of the wire elements projecting through or exposed on the road engaging tread surface of the tire occur in pairs. Each pair is connected by a deeply embedded U-shaped portion which extends beneath one of the tread grooves 8. Thus, each of the deeply embedded U-shaped elements or portions has ends located or exposed on the road engaging surface of different though adjacent tread ribs.

In the tire of the present invention, the anti-skid properties are continuously developed as the tread surface is worn away in use. Thus the anti-skid properties may be greater or better developed after a period of use of the tire than when the tire is new. If desired, of course, the wire elements or cables can be exposed, as shown in Fig. 2, by buffing, abrading or otherwise removing the surface layer of rubber on the tire tread before placing the tire in service.

In accordance with the patent statutes the principles of the present invention can be utilized in various ways, numerous modifications and alterations being contemplated, substitution of parts and changes in construction being resorted to as desired, it being understood that the tire shown in the drawings and described above and the particular method set forth are given merely for purposes of explanation and illustration without intending to limit the scope of the claims to the specific details disclosed.

What I claim and desire to secure by Letters Patent of the United States is:

1. A pneumatic tire comprising a cord-reinforced rubber body having a relatively thick annular tread portion and superimposed layers of oppositely-oriented, diagonally-disposed, pliable metal wire cables embedded in the tread portion in the vicinity of the road-contacting surface thereof, said wire cables each comprising a plurality of strands which in turn comprise a plurality of twisted filaments and each cable being of wave form to provide a plurality of spaced portions relatively deeply embedded in the tread portion and a plurality of spaced portions relatively close to the road-contacting surface of the tread portion.

2. A pneumatic tire comprising a cord-reinforced rubber body having a relatively thick, road-engaging, annular tread portion and superimposed layers of oppositely-oriented, diagonally-disposed, pliable metal wire cables embedded in the tread portion in the vicinity of the road-engaging surface thereof, said wire cables each comprising a plurality of strands which in turn comprise a plurality of twisted filaments and being embedded and forced into the tread portion in accordance with the projections of the tire mold so that the deeply embedded portions extend beneath the tread grooves, which are in turn formed by the projections of the tire mold, and the other portions intermediate the grooves are relatively close to road-engaging surface of the tread portion.

References Cited in the file of this patent

UNITED STATES PATENTS

| | | |
|---|---|---|
| Re. 23,235 | Hawkinson | May 30, 1950 |
| 1,021,171 | Ward | Mar. 26, 1912 |
| 1,083,231 | Wale | Dec. 30, 1913 |
| 1,111,419 | Wadsworth | Sept. 22, 1914 |
| 1,415,281 | Wale | May 9, 1922 |
| 2,006,038 | Yamaki | June 25, 1935 |
| 2,143,694 | Hauvette | Jan. 10, 1939 |
| 2,493,614 | Bourdon | Jan. 3, 1950 |
| 2,513,064 | Solomon | June 27, 1950 |
| 2,542,871 | Johnson | Feb. 20, 1951 |
| 2,557,945 | Crooker | June 26, 1951 |
| 2,605,199 | Hawkinson | July 29, 1952 |

OTHER REFERENCES

"Non-Skid," Scientific American, May 1943, pages 224–225.